Nov. 16, 1937.     W. J. DE WITT ET AL     2,099,003
TACKLE BOX
Filed Feb. 19, 1937
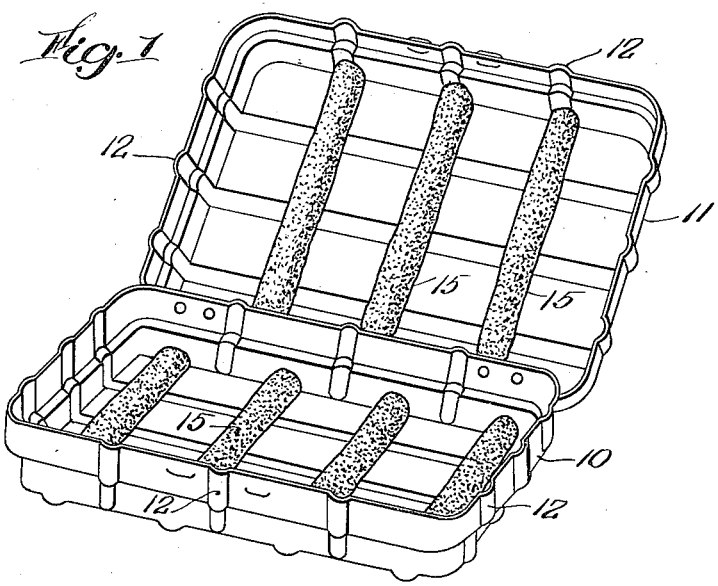
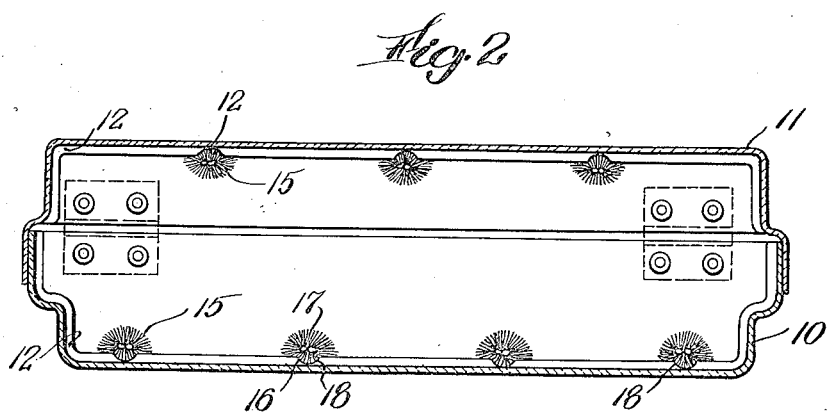

Patented Nov. 16, 1937

2,099,003

UNITED STATES PATENT OFFICE 2,099,003

TACKLE BOX

William J. De Witt and Paul A. Ross, Auburn, N. Y., assignors to Shoe Form Co., Inc., Auburn, N. Y., a corporation of New York Application February 19, 1937, Serial No. 126,609

3 Claims. (Cl. 43—32)

This invention relates to an improvement in tackle boxes and is a further development of the invention in such boxes disclosed in our copending application Serial No. 87,617, filed June 27, 1936.

The primary object of this invention is to provide a box with means for removably holding flies, hooks and other tackle in position, such means consisting of elements mounted in the box, as for example, bars including a core of wire or the like and a cover of plush, felt or similar material, adapted to be engaged by hooks or the like.

This and other objects will appear from an examination of the following description and of the drawing which forms a part thereof and in which Fig. 1 is a perspective view of a fly box embodying this invention with the cover open; and Fig. 2 is an enlarged longitudinal section through the fly box when closed.

The fly box comprises a base 10 and cover 11 hinged thereto and each provided with transversely and longitudinally extending corrugations 12 so positioned that when the box is closed the ribs formed by the corrugations in the base enter the grooves formed by the corrugations in the cover.

In order to position flies placed in the box a plurality of cross bars 15 are mounted in the base and cover. The bars comprise a central core 16, here shown as comprising two twisted wires and a covering 17 of plush, felt or the like. As shown in Fig. 2 the bars in the cover are mounted in the grooves formed by the transverse corrugations 12 and in the base are mounted in grooves formed by similar corrugations 18 which are offset from the corrugations 12. The transverse corrugations 12 in the base are at the front and rear walls only and do not extend across the bottom. The bars 15 are secured in position in any desired manner as by the use of a suitable adhesive.

The ends of the hooks of the flies are easily slipped below the cores 16 of the cross bars or may be embedded in the covering 17. The flies are thus held against shifting their position and can be readily found and removed when desired.

While one embodiment only of this invention has been shown and described it will be understood that this invention is not limited thereto and that other embodiments may be made without departing from the spirit and scope thereof as set forth in the following claims.

We claim:

1. A tackle box comprising a base and cover, having, in the bottom wall of the base and top wall of the cover, corrugations which form transversely extending grooves and bars mounted in said grooves, said bars being adapted to engage the hooks of flies and hold them in position.

2. A tackle box comprising a base and cover, having, in the bottom wall of the base and top wall of the cover, corrugations which form transversely extending grooves and bars, each bar including a core and a covering therefor, mounted in said grooves with the cores spaced from the walls whereby the hooks of flies penetrate the coverings and enter the spaces between the cores and the walls on which the bars are secured.

3. A tackle box comprising a base and cover, having, in the bottom wall of the base and top wall of the cover, corrugations which form transversely extending grooves and bars, each bar including a core and a covering therefor, mounted in said grooves with the coverings adhesively secured to the bottoms of the grooves and the cores spaced therefrom whereby the hooks of flies penetrate the coverings and enter the spaces between the cores and the bottoms of the grooves in which the bars are secured.

WILLIAM J. DE WITT.
PAUL A. ROSS.